Figure 1:
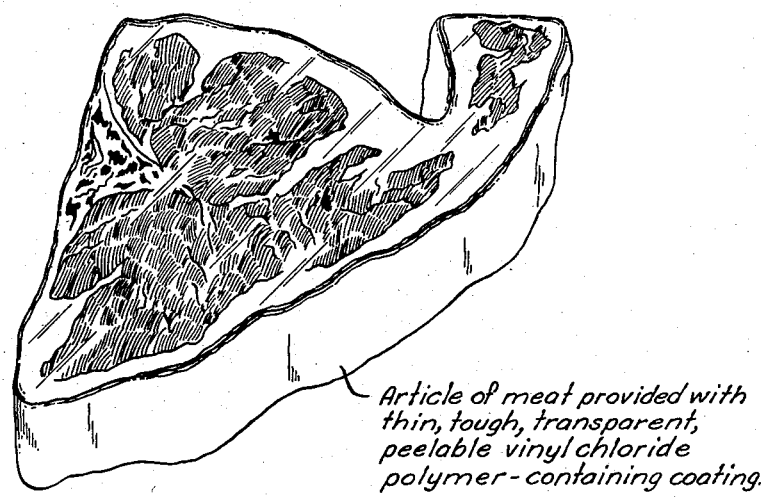

June 24, 1958   L. E. PATTEN ET AL   2,840,475
METHOD OF COATING ARTICLES OF FOOD AND PRODUCT
OBTAINED THEREBY
Filed June 17, 1957

Article of meat provided with thin, tough, transparent, peelable vinyl chloride polymer-containing coating.

Thin, tough, transparent, peelable vinyl chloride polymer-containing coating

INVENTORS.
Lorraine E. Patten
Harold C. Kelly

BY Griswold & Burdick
ATTORNEYS

United States Patent Office 2,840,475
Patented June 24, 1958

2,840,475

METHOD OF COATING ARTICLES OF FOOD AND PRODUCT OBTAINED THEREBY

Lorraine E. Patten and Harold C. Kelly, Midland, Mich., assignors to The Dow Chemical Company, Midland, Mich., a corporation of Delaware Application June 17, 1957, Serial No. 665,987

9 Claims. (Cl. 99—166)

This invention has reference to the use of coating compositions comprising vinyl chloride polymers which are especially suited for enveloping certain articles of food, particularly meat and meat products, in tightly adhering protective coatings which may readily be stripped or peeled from the article. More particularly, it is concerned with the employment of such a coating composition as is applied from the molten condition of the type or variety that are frequently referred to and characterized as being "hot melts." The invention has specific reference to a method for coating food articles with such compositions and to coated articles thereby obtained.

It would be advantageous to provide certain articles of food, particularly meat and meat products, with tough closely conforming coatings which have protective and preservative value and which could be readily removed by clean and efficient stripping or peeling operations.

It would be additionally beneficial for such a coating to be imbued with other desirable characteristics, including flexibility at temperatures which are commonly encountered in refrigerators and food freezers; transparency and attractive appearance (even when the coated article is in a hard frozen condition at relatively low temperatures); relatively high impermeability to gases, water and other common vapors to minimize or prevent the appearance of oxidation, dehydration or contamination in the coated foodstuff; and, as a primary requirement, absolute non-toxicity; i. e., freedom from any tendency to transfer harmful materials to the foodstuff. It would be highly desirable for such coatings to be obtainable from readily available and inexpensive materials and to be utilizable in a convenient and economic manner.

These and other desirable advantages and benefits may be derived in the practice of the present invention which utilizes a vinyl chloride polymer coating composition that is comprised essentially of between about 12 and 25, and preferably between about 18 and 22, percent by weight (based on the weight of the composition) of a film-forming vinyl chloride polymer, particularly polyvinyl chloride; between about 5 and 15 percent by weight of an epoxy type plasticizer, preferably an epoxidized natural glyceride of unsaturated fatty acids such as the epoxidized vegetable oils from soybeans of the ester type that are obtained commercially under the trade designation "Paraplex G62" and "Paraplex G60" (or equivalent epoxidized vegetable oils containing say, from 14 to 24 carbon atoms in its molecule) and 3-(2-xenoxyl)-1,2-epoxy propane; between about 60 and 75 percent by weight of a non-toxic plasticizer for vinyl resins such as acetyl citrates, dioctyl phthalates and the like and, optionally and advantageously, between about 0.2 and 3 percent by weight of a suitable non-toxic stabilizing material for the vinyl chloride polymer.

The compositions that are employed in the practice of the present invention ordinarily form molten mixtures at temperatures that are in excess of the boiling point of water. They may be applied by the method of the invention in any desired manner to articles which may be at any temperature beneath that of the hot melt. The hot melt itself is, in general, a viscous, transparent, slightly yellow solution having relatively "rubbery-characteristics." The coating derived from the composition also exhibits analogous, relatively rubbery properties. Advantageously, particularly when fresh meat or meat products are involved, the coating composition may be applied by a method which comprises freezing the article, or at least the surface of an article of food to be coated; and coating the frozen article with the molten composition. Such a method is beneficial in that the surface of the article being coated, particularly meats and the like is less likely to attain discoloring temperatures and those causing vaporization of surface juices. While brushing, spraying, splashing and other techniques may be employed in order to apply the coating composition to the article, it is frequently more expedient to employ dip coating techniques for this purpose, wherein the article is dipped in the molten composition to obtain the desired coating "pick-up," after which it is withdrawn and the applied coating composition permitted to cool and harden. Regardless of the particular technique that is utilized for application of the coating, it is important to maintain a relatively close control over the temperature of the hot melt that is being applied. Generally, hot melt temperatures between about 130° C. and 165° C. preferably of at least 145° C., are maintained in the hot melt composition. When lower temperatures are involved, the composition tends to become too viscous to permit practical application over the desired articles. At temperatures much above 165° C., the hot melt tends to degrade and darken to an intolerable extent.

Coated articles of food, particularly meats, in accordance with the present invention, have a highly attractive and exceptionally pleasing appearance. The coating has absolute transparency over a wide temperature range, even at temperatures as low as those in the neighborhood of −15 to −20° C. and lower. This desirable feature permits a ready visual inspection and evaluation to be made of the coated foodstuff. The coating is not sticky, oily, greasy or otherwise uncomfortable to touch or handle. It adheres tightly as a thin, limpid film about the article and conforms closely to its contours, even when bony meats or fowl are involved. It is non-toxic and does not impart objectionable odors or tastes to the food which is coated, despite the fact that when certain plasticizers are employed in the composition, such as the acetyl citrates, the hot melt may generate a very slight, yet pleasant odor. The coating is readily peelable, cuttable or strippable in a clean and efficient manner from the article of food over which it is provided. It does not require washing or other tedious and inconvenient procedures for its complete removal. In addition, the coating is relatively flexible at below-freezing temperatures. Thus, it resists damage due to handling and storage of a coated article that is being maintained in a frozen condition. It has an extremely low rate of gas and water transmission, comparable to those which are found in other distinct varieties of vinyl chloride polymer type coatings. This permits the coated articles of food to be preserved in a better condition and to be less susceptible to becoming rancid or dehydrated or to develop "freezer burn." In addition, the coating composition of the present invention effectively prevents the absorbtion of undesirable foreign odors and tastes in the food product.

The vinyl chloride polymer which may be employed in the practice of the present invention may, as has been indicated, advantageously be polyvinylchloride. If desired, however, film-forming copolymers of vinyl chloride with vinyl acetate may also be employed which contain in the polymer molecule at least about 85 percent by weight of vinyl chloride. The vinyl chloride polymer that is employed should be of the grade that has a viscosity of about 2.0 centipoises, although polymers whose viscosities (as determined at 120° C. with a 2.0 percent solution of the resin in ortho-dichlorobenzene) are in the range from about 1.4 to 2.5 centipoises are generally suitable.

As has been indicated, practically any nontoxic, compatible plasticizer for vinyl resins can be employed in the practice of the present invention, providing it is not volatile (practically speaking) at the temperature of application and does not impart any disagreeable or otherwise intolerable odor or taste to the coating or the coated foodstuff. Besides dioctyl phthalate and acetyl citrates, such plasticizers as 2-ethyl hexyl diphenyl phosphate, dicapryl phthalate, dibutyl sebacate, butylphthalyl butyl glycollate (available commercially under the trade-designation "Santicizer B–16") and methylphthalyl ethyl glycollate (available commercially as "Santicizer M–17") and the like may be employed. Specific acetyl citrate plasticizers which may be employed with great advantage in the practice of the invention are acetyl tributyl citrate and acetyl triethyl citrate. The above-identicated "Santicizers" are also capable of being utilized with great benefit.

The use of a stabilizer facilitates retention of the clear and lucid characteristics of the coating compositions of the invention. Typical of the non-toxic stabilizers which may be employed are those which are available commercially under the trade-designations "Ferro 707X" and "Ferro 760X." These materials, upon the basis of reasonable information and belief, are thought to be mixtures, in aqueous emulsion, of high molecular weight alkyl esters of long chain 10 to 18 carbon atom or so fatty acids (such as octyl stearate) and minor proportions of zinc or calcium, or both, salts of the same fatty acids. "Ferro 707X," for example, which has a relatively crystalline appearance, is thought to be a mixture of octyl stearate with about 2.5 percent by weight of zinc stearate. "Ferro 760X" has a partially amorphous appearance and is thought to be a mixture of octyl stearate with about 2.5 percent by weight of zinc stearate and 1 percent of calcium stearate.

In preparing the vinyl chloride polymer hot melt coating compositions for use in the present invention, care should be taken to select such relative proportions of the ingredients as will produce a coating having optimum characteristics. Thus, in some combinations of ingredients, a larger proportion of the vinyl chloride polymer may produce a more viscous hot melt than is desirable for particular operating temperatures whereas smaller proportions in some instances may not lend sufficient strength to the coating. Similarly greater amounts of plasticizer may sometimes tend to yield an oily film on the coating or a coating that is softer or more tacky than might be otherwise obtained. On the other hand, smaller amounts of plasticizer may sometimes increase the viscosity of the hot melt beyond more desirable degrees. A properly formulated composition should permit applied film thicknesses to be obtained by hot dipping techniques that are between about 25 and 100 mils and preferably between about 50 and 85 mils with a single immersion and moderately slow withdrawal (say, within several seconds) of the article desired to be coated. Of course, as can readily be appreciated generally thinner applied coatings can be obtained, if desired, especially when other than dip coating techniques are utilized for their application. As a matter of fact, it may oftentimes be economically attractive for the thickness of the applied coatings to be in the neighborhood of 10–15 mils or so.

Since the hot melt compositions that are used in practice of the present invention are at relatively high temperatures during their application, it is advantageous to coat many articles while they are in a frozen condition. This minimizes the possibility of causing slight surface discoloration and dehydration of the foodstuff, particularly when meat and meat products are being coated. In this manner any objections to the coated articles which might stem from such defects may be obviated. The discolorations which may occur from coating food articles while they are at normal temperatures are not harmful however, and bear no relationship to their quality or wholesomeness in any consideration other than appearance. Thus, if it is suitable, food articles which are not in a frozen condition may be coated satisfactorily in the practice of the present invention. As a matter of fact, there may be instances where no significant advantage can be realized in cooling or freezing the article before coating. This may be the case, for example, when various smoked or cured meats, fish or fowl are being coated. The normal treated appearance of such foodstuffs is acceptable and does not detract from their marketability.

Figure 2:
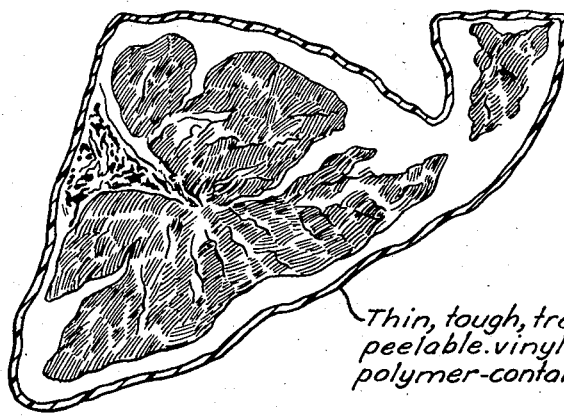

By way of illustration, various cuts of beef and pork were coated by first freezing them and then dip coating them with a hot melt at about 155° C. which was comprised of about 20 percent by weight of 2.0 centipoise polyvinyl chloride about 13 percent by weight of "Paraplex G–62"; about 2 percent by weight of "Ferro Non-Toxic 707X" and the balance acetyl tributyl citrate. After the dipping, which in each case required only a few seconds and generally was completed in less than 5 seconds, the coating was allowed to cool and harden. All of the coated articles, as schematically illustrated with one of them in a perspective view in Figure 1 and in cross-section in Figure 2 of the accompanying drawing, had an attractive, sparkling and pleasing appearance and were not objectionable to the touch. The applied coatings, whose thicknesses averaged between about 50 and 85 mils, adhered tightly to each of the articles and conformed closely to them as a very thin, enveloping film about their various irregular contours. The coatings were of excellent clarity, allowing normal and unimpaired visual inspection of the coated articles which retained their essential natural appearances. The coatings were tough and would not become embrittled at freezing temperatures. They could be stripped cleanly from the articles without remnants or segments thereof adhering to the foodstuff. This permitted the coated articles to be obtained in their normally available condition after being freed of the coating. In addition, the coating provides apparently indefinite protection against the "freezer burn" when the articles are maintained in a frozen condition at a temperature of about −15° C. for periods of time as long as two or three months or more. No loss in weight of the foodstuff that is coated in accordance with the invention and stored for the indicated periods in a frozen condition can be determined. In addition, after such extended periods of storage, each of the meats, when thawed and stripped of the coating is found to remain in a bright red and fresh looking condition to furnish further evidence of the efficacy and the moisture retaining qualities of the applied vinyl chloride polymer hot melt coatings.

Equivalent good results are similarly obtainable with other varities of meats and with poultry if care is taken to suitably plug or cover the cavities in their dressed carcasses. Various cheeses may also be coated satisfactorily with hot melt compositions similar to the foregoing.

What is claimed is:

1. Method for coating articles of food which comprises applying to the article, while it is being maintained at a relatively lower temperature, a thin enveloping film having a thickness between about 10 and 100 mils of a coating from a composition in molten form and at a temperature between about 130° and 165° C., said composition consisting of between about 12 and 25 percent by weight, based on the weight of the composition, of a film-forming vinyl chloride polymer selected from the group consisting of polyvinylchloride and copolymers of vinyl chloride with vinyl acetate that contain in the polymer molecule at least about 85 percent by weight of vinyl chloride, said vinyl chloride polymer having a viscosity between about 1.4 and 2.5 centipoises as determined by measurement at 120° C. of a 2.0 percent by weight solution of the resin in ortho-dichlorobenzene; about 5 to 15 percent by weight of an epoxy type plasticizer for vinyl resins; and about 60 to 75 percent by weight of a non-toxic plasticizer for vinyl resins; and subsequently cooling the applied coating on the article to a hardened condition.

2. Method for coating articles of food which comprises freezing the article of food to be coated; applying to the article, while it is being maintained at a relatively low temperature, a thin enveloping film having a thickness between about 10 and 100 mils of a coating from a composition in molten form and at a temperature between about 130° and 165° C., said composition consisting of between about 12 and 25 percent by weight, based on the weight of the composition, of a film-forming vinyl chloride polymer selected from the group consisting of polyvinylchloride and copolymers of vinyl chloride with vinyl acetate that contain in the polymer molecule at least about 85 percent by weight of vinyl chloride, said vinyl chloride polymer having a viscosity between about 1.4 and 2.5 centipoises as determined by measurement at 120° C. of a 2.0 percent by weight solution of the resin in ortho-dichlorobenzene; about 5 to 15 percent by weight of an epoxy type plasticizer for vinyl resins; about 0.2 to 3 percent of a non-toxic stabilizer for vinyl resins; and about 60 to 75 percent by weight of a non-toxic plasticizer for vinyl resins; and subsequently cooling the applied coating on the article to a hardened condition.

3. The method of claim 2, wherein the composition is applied to the frozen article by dip coating.

4. The method of claim 2, wherein said composition contains between about 18 and 22 percent by weight of the vinyl chloride polymer.

5. The method of claim 2, wherein the vinyl chloride polymer in said composition is polyvinylchloride.

6. A method in accordance with the method set forth in claim 5, wherein the viscosity of said polyvinylchloride is about 2.0 centipoises as determined by measurement at 120° C. of a 2.0 percent by weight solution of the resin in ortho-dichlorobenzene.

7. The method of claim 2, wherein the epoxy plasticizer in said composition is an epoxidized natural glyceride of unsaturated fatty acids containing from 14 to 24 carbon atoms in their molecules.

8. The method of claim 2, wherein the plasticizer in said composition is acetyl tributyl citrate.

9. A coated food article as produced by the method of claim 1.

References Cited in the file of this patent

UNITED STATES PATENTS

| | | |
|---|---|---|
| 2,563,079 | Smith | Aug. 7, 1951 |
| 2,577,211 | Scharf | Dec. 4, 1951 |
| 2,682,475 | Smith | June 29, 1954 |
| 2,782,175 | Bruins et al. | Feb. 19, 1957 |
| 2,789,101 | Wilson | Apr. 16, 1957 |